(12) United States Patent
Kohout et al.

(10) Patent No.: US 6,547,320 B2
(45) Date of Patent: Apr. 15, 2003

(54) OPENABLE MOTOR VEHICLE ROOF SEALING SYSTEM FOR A SUPPORT LEVER

(75) Inventors: Erwin Kohout, München (DE); Wolfgang Dittrich, Gilching (DE)

(73) Assignee: Webasto Vehicle System International GmbH, Stockdorf (DE)

( * ) Notice: Subject to any disclaimer, the term of this patent is extended or adjusted under 35 U.S.C. 154(b) by 0 days.

(21) Appl. No.: 09/963,661

(22) Filed: Sep. 27, 2001

(65) Prior Publication Data
US 2002/0070586 A1 Jun. 13, 2002

(30) Foreign Application Priority Data
Sep. 27, 2000 (DE) .......................................... 100 48 990

(51) Int. Cl.⁷ ................................................. B60J 7/047
(52) U.S. Cl. .................................. 296/223; 296/216.03
(58) Field of Search ..................... 296/216.02–216.05, 296/216.07, 216.08, 223; 384/15

(56) References Cited

U.S. PATENT DOCUMENTS

| 2,962,773 | A | * | 12/1960 | Heller ........................... 384/15 |
| 3,446,539 | A | * | 5/1969 | Sartorio ......................... 384/15 |
| 4,376,543 | A | * | 3/1983 | Sakagami .................. 384/15 X |
| 4,752,099 | A | * | 6/1988 | Roos et al. ................... 296/223 |
| 4,892,416 | A | * | 1/1990 | Hassler, Jr. et al. ........... 384/15 |
| 6,158,803 | A | * | 12/2000 | Reihl et al. ............. 296/216.04 |
| 2001/0005093 | A1 | * | 6/2001 | Nabuurs ...................... 296/223 |
| 2001/0030452 | A1 | * | 10/2001 | Karami et al. .......... 296/220.01 |

FOREIGN PATENT DOCUMENTS

| DE | 84 18 216 U1 | 1/1985 |
| DE | 37 09 612 | 7/1988 |
| DE | 197 13 347 | 5/1999 |

* cited by examiner

Primary Examiner—Dennis H. Pedder
(74) Attorney, Agent, or Firm—Nixon Peabody LLP; David S. Safran

(57) ABSTRACT

A motor vehicle roof (1) with a sealing system for a support lever (11) in which a pair of seals (14, 15) adjoin one another at their sealing surfaces so as to cover the support lever (11) form above in a lowered position of the lever and are pressed to the side by the support lever (11) when it is moved into a raised support position. The use of a pair of seals instead of a single seal reduces and the seals (14, 15) are preferably hollow chamber seals.

14 Claims, 1 Drawing Sheet

OPENABLE MOTOR VEHICLE ROOF SEALING SYSTEM FOR A SUPPORT LEVER

BACKGROUND OF THE INVENTION

1. Field of the Invention

The invention relates to a sealing system for a support lever on an openable motor vehicle roof in which at least one seal at least partially covers the support lever from above in the lowered position and is pressed to the side by the lever upon passage into a support position.

2. Description of Related Art

German Patent DE 197 13 347 C1 discloses a sealing system of the initially mentioned type in which a support lever on a fixed motor vehicle roof pushes the sealing lip away when passing through a sealing gap of a guide channel. Upon passage and with the subsequent sliding motion of the support lever, the sealing lip is highly stressed and thus tends to wear prematurely.

SUMMARY OF THE INVENTION

A primary object of the invention is to devise a sealing system which enables improved sealing with reduced wear.

This object is achieved by the sealing system having two seals which are opposite one another, which adjoin one another with their sealing surfaces in the lowered position of the support lever, and after passage of the support lever adjoin it.

One preferred embodiment of the invention calls for the seals to be made as hollow chamber seals. In such a case, the hollow chambers have a diameter which roughly corresponds to the width of the support lever. This ensures that the hollow chambers are compressed only to about one half of their diameter after passage of the support lever.

The sealing surfaces of the hollow chamber seals are preferably coated with a lubricating varnish. This greatly reduces friction and wear.

One embodiment of the invention is described in detail below with reference to the accompanying drawings.

DETAILED DESCRIPTION OF THE INVENTION

Figure 1:
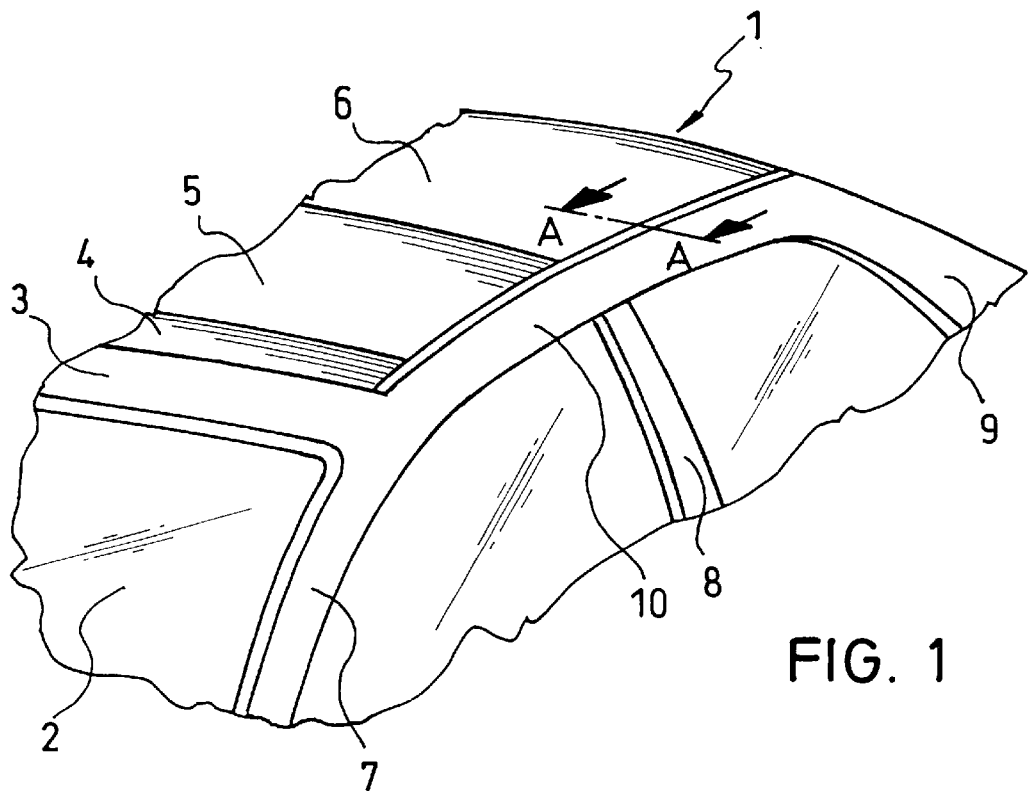
FIG. 1 shows a schematic perspective partial view of a motor vehicle roof.

FIG. 1 shows a fixed vehicle roof 1 in which the front windshield 2 adjoins an apron 3, a wind deflector 4 which is made as a wind deflector louver, a movable cover 5 which is located behind it, and a fixed roof window 6 which lies behind the movable cover 5. The wind deflector 4 is supported near its front edge by means of a pivot support to be able to pivot on the fixed motor vehicle roof 1 or on the apron 3. The motor vehicle roof 1 is laterally bordered by side members 10 which are connected to the A columns 7, the B columns 8 and the C columns 9.

When the wind deflector 4 is in its closed position, its back end flushly adjoins the front edge of the closed cover 5. The cover 5 can be raised at its rear edge and can be moved along the lateral guides (not shown, see in this regard, e.g., the initially mentioned German Patent DE 197 13 347 C1) to the rear over the fixed roof pane 6. Before moving the cover 5, a support lever 11, which is supported on a movable carriage, is activated to swing up and support the cover 5 near its back edge during the entire displacement motion, as is explained detail in German Patent DE 197 13 347 C1.

Between the side member 10 and the fixed roof pane 6, there is a sealing system which closes the guide channel for the support lever 11 (or its carriage) from above the top in the lowered position of lever 11 so that the motor vehicle roof 1 with the cover 5 closed has a smooth appearance.

Figure 2:
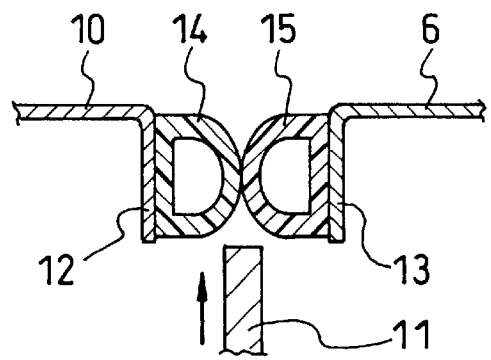
FIG. 2 is a sectional view taken along line A—A in FIG. 1, showing one embodiment of a sealing system with the support lever retracted.

The sealing system is formed by two hollow chamber seals 14, 15 which, as shown in FIG. 2, with the support lever 11 lowered, adjoin one another with their facing sealing surfaces engaging one another. The first hollow chamber seal 14 is attached to the vertical flange 12 of the side member 10, for example, by cementing. The second hollow chamber seal 15 is attached to a vertical flange 13 of the rear roof pane 6, preferably likewise, by cementing.

Figure 3:
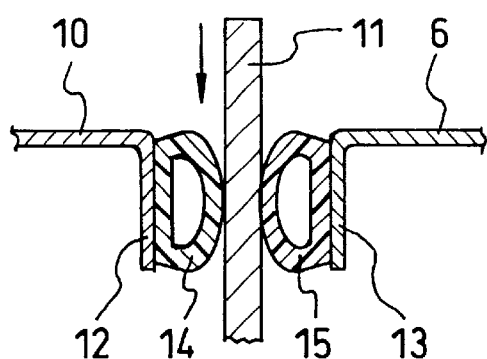
FIG. 3 shows the sealing system in FIG. 2 with the support lever extended.

As the support lever 11 passes upward, it presses the two hollow chamber seals 14, 15 apart, their sealing surfaces adjoining the side walls of the support lever 11 (FIG. 3.). Since the support lever 11, when pivoting up and upon subsequent displacement of the cover 5, slides along the sealing surfaces of the hollow chamber seals 14, 15, these sealing surfaces preferably are coated with a lubricating varnish. Such a lubricating varnish can contain, for example PTFE (TEFLON®) or silicone.

To prevent overly strong compression of the hollow chamber seals 14, 15, their hollow chambers preferably have a diameter which corresponds at least to the width of the support lever 11. Thus, the hollow chambers are compressed only to roughly half of their diameter.

The support lever 11 is preferably located in the middle between the sealing surface of the hollow chamber seals 14 and 15.

What is claimed is:

1. An openable motor vehicle roof with a support lever arrangement comprising:

a support lever mounted for movement between a lowered position and raised position; and two seals which have sealing surfaces which face each other, said sealing surfaces adjoining each other in the lowered position of the support lever, and which adjoin the support lever in the raised position thereof; wherein the seals are hollow chamber seals.

2. An openable motor vehicle roof as claimed in claim 1, wherein a hollow chamber of the hollow chamber seals has a diameter which is approximately equal to a width of the support lever in a direction of compression of the hollow chambers.

3. An openable motor vehicle roof as claimed in claim 1, further comprising a longitudinally extending side member have a vertical flange; wherein One of the seals is attached to the vertical flange of the side member.

4. An openable motor vehicle roof as claimed in claim 3, further comprising a fixed roof pane having a vertical flange; wherein the other of the seals is attached to the vertical flange of the fixed roof pane.

5. An openable motor vehicle roof as claimed in claim 4, wherein the seals are made of EPDM.

6. An openable motor vehicle roof as claimed in claim 5, wherein a hollow chamber of the hollow chamber seals has a diameter which is approximately equal to a width of the support lever in a direction of compression of the hollow chambers.

7. An openable motor vehicle roof as claimed in claim 6, wherein the sealing surfaces of the seals are coated with lubricating varnish.

8. An openable motor vehicle roof as claimed in claim 7, wherein the support lever is located centrally with reference the seals.

9. An openable motor vehicle roof as claimed in claim 1, further comprising a longitudinally extending side member having a vertical flange; wherein one of the seals is attached to the vertical flange of the side member.

10. An openable motor vehicle roof as claimed in claim 1, further comprising a fixed roof pane having a vertical flange; wherein one of the seals is attached to the vertical flange of the fixed roof pane.

11. An openable motor vehicle roof as claimed in claim 1, wherein the seals are made of EPDM.

12. An openable motor vehicle roof as claimed in claim 1, wherein the sealing surfaces of the seals are coated with lubricating varnish.

13. An openable motor vehicle roof as claimed in claim 1, wherein the support lever is located centrally with reference the seals.

14. An openable motor vehicle roof as claimed in claim 1, wherein the support lever is a pivoting lever for raising and lowering of a movable cover panel.

* * * * *